(12) United States Patent
Sundaresan

(10) Patent No.: US 9,489,461 B2
(45) Date of Patent: Nov. 8, 2016

(54) SEARCH RANKING DIVERSITY BASED ON ASPECT AFFINITY

(71) Applicant: eBay Inc., San Jose, CA (US)

(72) Inventor: Neelakantan Sundaresan, Mountain View, CA (US)

(73) Assignee: eBay Inc., San Jose, CA (US)

(*) Notice: Subject to any disclaimer, the term of this patent is extended or adjusted under 35 U.S.C. 154(b) by 81 days.

(21) Appl. No.: 14/195,283

(22) Filed: Mar. 3, 2014

(65) Prior Publication Data

US 2015/0248481 A1    Sep. 3, 2015

(51) Int. Cl.
*G06F 17/30* (2006.01)

(52) U.S. Cl.
CPC ..... *G06F 17/30864* (2013.01); *G06F 17/3053* (2013.01); *G06F 17/30598* (2013.01)

(58) Field of Classification Search
CPC ............... G06F 17/30598; G06F 17/30312; G06F 17/30864; G06F 17/3053
See application file for complete search history.

(56) References Cited

U.S. PATENT DOCUMENTS

| | | | |
|---|---|---|---|
| 8,620,909 B1 * | 12/2013 | Rennison | G06F 17/3066 707/722 |
| 2003/0220913 A1 * | 11/2003 | Doganata | G06F 17/30867 |
| 2011/0191321 A1 | 8/2011 | Gade et al. | |
| 2011/0225155 A1 * | 9/2011 | Roulland | G06F 17/30598 707/737 |
| 2013/0268517 A1 * | 10/2013 | Madhavan | G06F 17/3053 707/722 |
| 2015/0006314 A1 | 1/2015 | Goulart et al. | |
| 2015/0095302 A1 | 4/2015 | Loftus et al. | |

OTHER PUBLICATIONS

International U.S. Appl. No. PCT/US2016/028753, International Search Report mailed Jul. 15, 2016, 5 pgs.
International Application U.S. Appl. No. PCT/US2016/028753, Written Opinion mailed Jul. 15, 2016, 8 pgs.
U.S. Appl. No. 14/695,139, filed Apr. 24, 2015, Generating a Discovery Page Depicting Item Aspects.

* cited by examiner

*Primary Examiner* — Leslie Wong
(74) *Attorney, Agent, or Firm* — Schwegman, Lundberg & Woessner, P.A.

(57) ABSTRACT

Collaborative filtering along the aspect dimension and use of co-occurring aspects to qualify products that will be shown on a search page in response to unspecific user searches, such that diversity in the aspect value will add to the diversity of the search results and the collaborative nature of the aspects will induce diversity, is disclosed. A method and system for Search Ranking Diversity Based on Aspect Affinity includes collecting user search queries, parsing the collected user search queries for aspect phrases, identifying aspect metadata for the aspect phrases, creating a ranked index list of aspects from the aspect metadata, assigning weights to the ranked index list of aspects, receiving a user query and associating the received query with the ranked index list of aspects to produce ranked search results, and re-ranking the search results using diversified aspects from the ranked index list of aspects to produce user search results.

20 Claims, 4 Drawing Sheets

SEARCH RANKING DIVERSITY BASED ON ASPECT AFFINITY

TECHNICAL FIELD

The present application relates generally to the technical field of commercial uses of search algorithms implemented on a computer and, in one example embodiment, to methods and systems to enable navigation of data items based on aspect affinity.

BACKGROUND

A user searching an information resource (e.g., database) may encounter challenges. One such challenge may be that a search mechanism (e.g., a search engine) that is utilized to search the information resource may return search results that are of little interest to the user. For example, the search mechanism may respond to a query from the user with search results containing data items that lack relevance or diversity. This is particularly challenging for generic queries where a user has not specified what aspect of the product they are interested in. Due to the lack of catalogs when searching and/or purchasing on-line, if relevance is over-emphasized, most products returned by a generic search look the same or similar on the first page with comparable prices. Sellers crowding the shelves complicate this problem. Efforts to diversify results often fail because they are not of interest to the buyer. Since search engines are not conversational, the best outcome contemporary search engines can produce are results that make the user take the next action rather than leave the site. Unfortunately, this approach does not capture user intent, i.e. the intent of users when they type in a general query. Thus, there is a need for qualifying products that will be shown on the search page such that diversity in the aspect value will add to the diversity of the search results and the collaborative nature of the aspects will induce diversity.

BRIEF DESCRIPTION OF THE DRAWINGS

Some embodiments are illustrated by way of example and not limitation in the figures of the accompanying drawings in which.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Example methods and systems for Search Ranking Diversity Based On Aspect Affinity are described. In the following description, for purposes of explanation, numerous specific details are set forth in order to provide a thorough understanding of example embodiments. It will be evident, however, to one skilled in the art that the present invention may be practiced without these specific details.

Today, search engines that search information resources to display commercial products only show product diversity based on the supply side, without taking into account user preferences at the aspect level. In other words, generic searching is not adequately based on an aspect of a product such as brand preference, material, size color or other feature on which, the buyer will actually base a decision to purchase a particular item. For example, a supply side driven search engine now returns 1.25 million matching results in response to a query for "athletic shoes", showing results for the three highest selling brands of athletic shoes. However, a shopper is unlikely to actually purchase a leading brand of women's athletic shoes in the same transaction as men's athletic shoes. Even if, with personalization, the system knows that the user querying the system is a male, the diversity of products are still supply-based.

Conversely, if a search system could identify the most important aspect of the products that are queried and use co-occurrences between the values of the important unspecified aspect(s), both diversity and relevance are reflected by the search results. Only those products having aspects that are important to the buyer are presented, while irrelevant results are suppressed. Han aspect value is specified in the query, the same index can be used to expand recall by bringing in products that have a collaborative aspect value, similar to merchandizing. In some embodiments detailed below, by taking advantage of an understanding of a neighborhood of queries based upon aspects that are most commonly used with the query, a shopper can be presented with both a relevant and diverse set of results. Other benefits of the embodiments of the present invention will be readily apparent from the description of the figures that follow.

Figure 1:
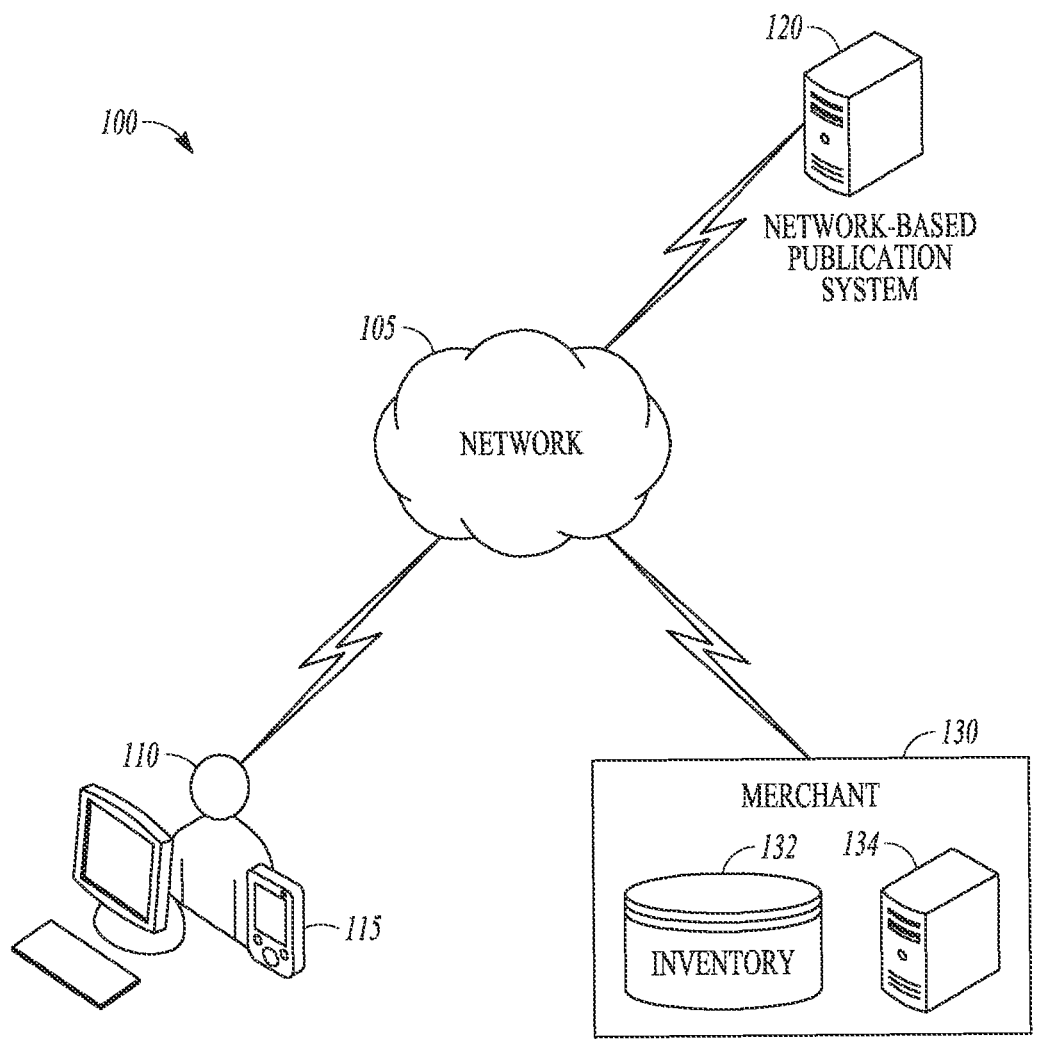
FIG. 1 is a block diagram depicting a system suitable for Search Ranking Diversity Based On Aspect Affinity, according to some example embodiments.

FIG. 1 is a network diagram illustrating a network environment suitable for Search Ranking Diversity Based On Aspect Affinity, according to some example embodiments. FIG. 1 shows a block diagram depicting a system 100 for delivering search results that can be both relevant and diverse by reflecting unspecified aspect values. The system 100 can include a user 110, a network-based publication system 120 with a search engine, and one or more merchants 130 (and merchant systems). In an example, the user 110 can connect to the network-based publication system 120 via a client computing device 115 (e.g., desktop, laptop, smart phone, Personal Digital Assistant (PDA), or similar electronic device capable of some form of data connectivity) and network 105. The network-based publication system 120 will receive and process a query from the user's client computing device 115, and return search results in a search results page or similar User interface (UI), typically with the most relevant results listed first (or, at the top).

In an example embodiment, the merchant 130 can operate computer systems, such as an inventory system 132 or a Point of Sale (POS) system 134. The network-based publication system 120 can interact with any of the systems used by merchant 130 for operation of the merchant's retail or service business. In an example, the network-based publication system 120 can work with both POS system 134 and inventory system 132 to obtain access to inventory available at individual retail locations operated by the merchant. This inventory information can be used in both generating product or service listings, and selecting and ordering search results served by the network-based publication system 120. An example network-based publication system 120 is detailed below in FIG. 2.

Figure 2:
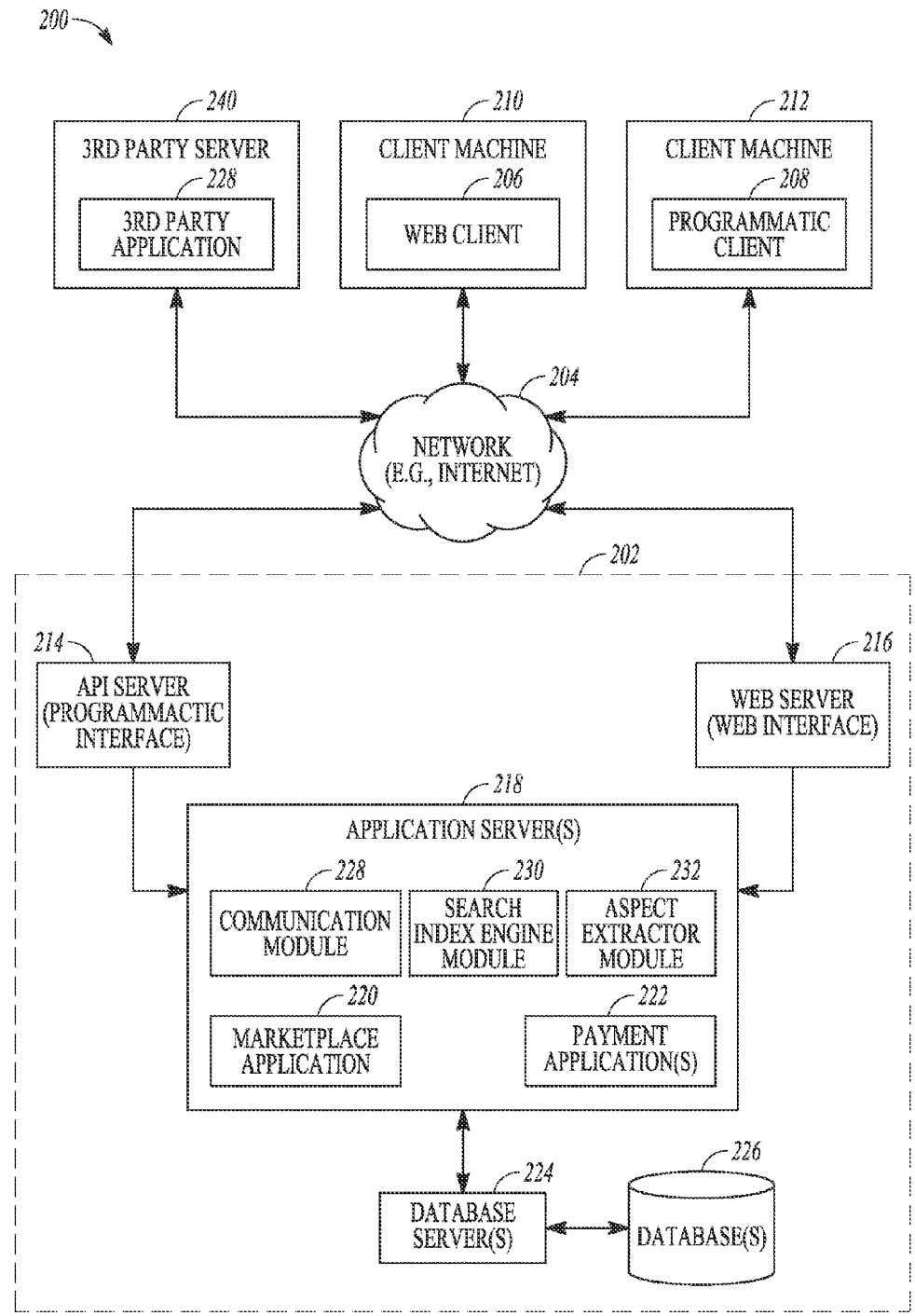
FIG. 2 is a block diagram illustrating a network-based publication system for processing a search query, and presenting search results (e.g., marketplace listings), as described more fully herein.
Figure 3:
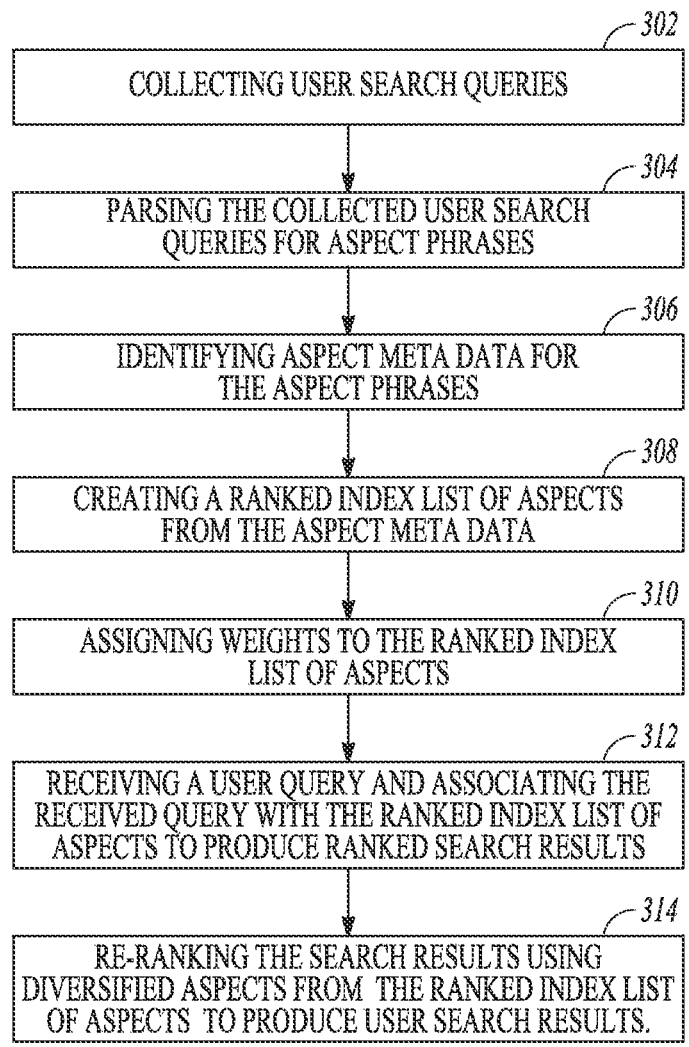
FIG. 3 Shows a block diagram of a high level overview flow chart of Search Ranking Diversity Based On Aspect Affinity, according to some example embodiments.

FIG. 2 is a block diagram illustrating a network-based publication system 200 for processing a search query, and presenting search results (e.g., marketplace listings), as described more fully herein. The block diagram depicts a network-based publication system 200 (in the exemplary form of a client-server system), within which an example embodiment of Search Ranking Diversity based on Aspect Affinity can be deployed. A networked system 200 is shown, in the example form of a network-based location-aware publication, advertisement, or marketplace system, that provides server-side functionality, via a network 204 (e.g., the Internet or WAN) to one or more client machines 210, 212. FIG. 3 illustrates, for example, a web client 206 (e.g., a browser, such as the Internet Explorer browser developed by Microsoft Corporation of Redmond, Wash. State) and a programmatic client 208 executing on respective client machines 210 and 212. In an example, the client machines 210 and 212 can be in the form of a mobile device, such as client computing device 115.

An Application Programming Interface (API) server 214 and a web server 216 are coupled to, and provide programmatic and web interfaces respectively to, one or more application servers 218. The application servers 218 host one or more marketplace application modules 220 (in certain examples, these can also include commerce modules, advertising modules, and marketplace modules, to name a few), payment modules 222, dynamic offer modules 232, search engine index modules 230 communication modules 228, and Aspect Extractor modules 232. The application servers 218 are, in turn, shown to be coupled to one or more database servers 224 that facilitate access to one or more databases 226. In some examples, the application server 218 can access the databases 226 directly without the need for a database server 224.

The publication modules 220 may provide a number of publication and search functions and services to users that access the networked system 200. The payment modules 222 may likewise provide a number of payment services and functions to users. The payment modules 222 may allow users to accumulate value (e.g., in a commercial currency, such as the U.S. dollar, or a proprietary currency, such as "points") in accounts, and then later to redeem the accumulated value for products (e.g., goods or services) that are advertised or made available via the various publication modules 220, within retail locations, or within external online retail venues. The payment modules 222 may also be configured to present or facilitate a redemption of offers, generated by the dynamic offer modules 222, to a user during checkout (or prior to checkout, while the user is still actively shopping). The offer modules 222 may provide dynamic context sensitive offers (e.g., coupons or immediate discount deals on targeted products or services) to users of the networked system 200. The offer modules 222 can be configured to use all of the various communication mechanisms provided by the networked system 200 to present over options to users. The offer options can be personalized based on current location, time of day, user profile data, past purchase history, or recent physical or online behaviors recorded by the network-based system 200, among other things (e.g., context information). While the publication modules 220, payment modules 222, and offer modules 222 are shown in FIG. 2 to all form part of the networked system 200, it will be appreciated that, in alternative embodiments, the payment modules 222 may form part of a payment service that is separate and distinct from the networked system 200. Additionally, in some examples, the offer modules 222 may be part of the payment service or may form an offer generation service separate and distinct from the networked system 200.

Further, while the system 200 shown in FIG. 2 employs a client-server architecture, the embodiments of the present invention are of course not limited to such an architecture, and could equally well find application in a distributed, or peer-to-peer, architecture system, for example. The various publication modules 220, payment modules 222, and offer modules 222 could also be implemented as standalone systems or software programs, which do not necessarily have networking capabilities.

The web client 206 accesses the various publication modules 220, payment modules 222, and offer modules 222 via the web interface supported by the web server 316. Similarly, the programmatic client 208 accesses the various services and functions provided by the publication modules 220, payment modules 222, and offer modules 222 via the programmatic interface provided by the API server 214. The programmatic client 208 may, for example, be a smartphone application that enables users to communicate search queries to the system 200 while leveraging user profile data and current location information provided by the smartphone or accessed over the network 200. FIG. 2 also illustrates a third-party application 228, executing on a third-party server machine 240, as having programmatic access to the networked system 200 via the programmatic interface provided by the API server 214. For example, the third-party application 228 may, utilizing information retrieved from the networked system 202, support one or more features or functions on a website hosted by the third party. The third-party website may, for example, provide one or more promotional, marketplace or payment functions that are supported by the relevant applications of the networked system 200. Additionally, the third-party website may provide merchants with access to the offer modules 222 for configuration purposes. In certain examples, merchants can use programmatic interfaces provided by the API server 214 to develop and implement rules-based pricing schemes that can be implemented via the publication modules 220, payment modules 222, and offer modules 222.

FIG. 3 Shows a block diagram of a high level overview flow chart of Search Ranking Diversity Based On Aspect Affinity, according to some example embodiments. Operations in the method 300 may be performed by the networked system 202 using the marketplace application(s) 220 module of the application server 218 in conjunction with a data base(s) 226 and database server(s) 226 described above with respect to FIGS. 1-2. As shown in FIG. 3, the method 300 includes operations 302-314.

A challenge in reducing friction in search (i.e. understanding what the user actually wants and showing what is wanted to finalize a purchase) is solving the diversity problem. This is particularly important when the user query is not specific. For instance, a user entering "hand bag" may not be clear as to what they are actually looking for in order to finalize a purchase. Since search engines are not conversational, the best outcome for traditional search engines can is to show results that makes the user take the next action rather than leave the site. Currently, attempts to mitigate this problem comprise showing aspect/value sets alongside search results.

For example, a sidebar that will narrow the search results if a user checks a box for color, size, brand, material or other feature of a generically entered product term without enough specificity to provide both relevance and diversity of search results may be shown. Another traditional method shows an even selection of products based upon a diverse selection of products created by distribution of the qualifying results across different categories, or a variation based upon a combination of distribution of aspects, distribution of sellers, or distribution of formats of products qualifying for the search. Unfortunately, none of these approaches capture user intent, or the intent of users when entering a general product search query. The Search Ranking Diversity Based on Aspect Affinity methodology addresses these challenges as detailed below in FIGS. 3 and 4.

For an example query: "hand bag", the most commonly occurring queries that contain the phrase "hand bag" may be "hand bag Gucci", "hand bag women's", "hand bag Louis Vuitton", "hand bag used", and "hand bag Coach" in decreasing order of frequency. By analyzing all query phrases, the Search Ranking Diversity Based on Aspect Affinity methodology can keep an index of a query with the query phrase type(s). An exemplary reduced index of this list would be "hand bag <brand>" (this covers Gucci, Louis Vuitton, Coach; and/or "hand bag <gender>" (this covers the "women's" query).

When a user enters the exemplary query: "hand bag", the Search Ranking Diversity Based on Aspect Affinity methodology knows that "brand" is the most commonly occurring phrase associated with the query, and it can be used to show a list of products from different hand bag brands. Further, because Gucci, Louis Vuitton, and Coach are most common, it may promote these at the higher ranks over other brand name designers. The Search Ranking Diversity Based on Aspect Affinity methodology may then determine that <gender> is the second most important aspect after brand, incorporate brand into the search results, and so on.

Additional specificity may be introduced. The Search Ranking Diversity Based on Aspect Affinity methodology may collect past information from all users who entered "hand bag" with another phrase in the query. This is particularly useful when showing search results for a user on whom there is no historic information. If there is some information on the user, the Search Ranking Diversity Based on Aspect Affinity methodology may use an index of queries for purchasers similar to this particular user. For example, if the Search Ranking Diversity Based on Aspect Affinity methodology knows that the user is a woman, it may then elect to use only information from other women users. Alternatively, if the user is of gender: man, the Search Ranking Diversity Based on Aspect Affinity methodology may elect not to use any of the index information from women users. In a third embodiment, the Search Ranking Diversity Based on Aspect Affinity methodology may use a history of past queries and product purchased by an individual user. For instance, if the Search Ranking Diversity Based on Aspect Affinity methodology knows that the user has entered brands as the most common aspect associated with a core query phrase for this or other purchases, the Search Ranking Diversity Based on Aspect Affinity methodology may determine that the user only purchases brand names and diversify the results based upon this aspect and show different, or most often purchased, brands of the product that qualify for the user query.

In operation 302, Search Ranking Diversity Based on Aspect Affinity methodology collects all user search queries. Control flows to operation 304.

In operation 304, collected user queries are parsed for aspect phrases. An aspect phrase may comprise a qualifier associated with an item. For an exemplary user search entry, "hand bag Coach", a brand aspect may be parsed. Control flows to operation 306.

In operation 306, metadata is identified for the aspect phrases. For example, the user query "hand bag coach", metadata "<brand>" may be identified. Control flows to operation 308.

In operation 308, a Ranked Index List of Aspects that are most common is created from the identified metadata. For an example user query "hand bag", Search Ranking Diversity Based on Aspect Affinity methodology may create an example a list of the form <query, <aspect1>, <aspect2>, . . . <aspectN,>>. Such an index may be created on a per-user cluster basis to allow for better personalization or on a per user basis such that affinity to certain aspect may be retained. The index may be created on a per user basis, or a per user per category basis, or a per user per query basis. An index created on a per user basis may reflect information from past queries by the same user while an index created on a per cluster (i.e. grouped according to a pre-defined criteria) basis may reflect information from a group of user queries or products. Likewise, an index created on a per user per category basis may contain information from queries received from same user for a single category of items such as shoes or handbags. Control flow proceeds to operation 312.

In operation 314, the Ranked Search results are re-ranked using diversified Aspects from the Ranked Index List of Aspects to Produce User Search Results. For example, when a user enters the exemplary generic query "hand bag", the Search Ranking Diversity Based on Aspect Affinity methodology uses the Ranked Index List of Aspects for collected information on the user query. Based upon the returned ranked list of aspects, the Ranked Search Results are re-ranked the using a diversified list of values. In an example embodiment, a diversified list for the top-k identified important aspects is used for re-ranking. For simplicity, k=1 in our example and the aspect is the "brand" aspect for the query "hand bag". In other embodiments, re-ranking may be performed according to user and category basis described above.

In addition to user product searches, other embodiments of Search Ranking Diversity Based on Aspect Affinity methodology may be used to diversify results in a recommender or merchandizing system where a user does not explicitly enter a query related to the results. In these embodiments, improved ranking of search results and/or more advantageous ordering of offerings in a recommender system or in a CRM marketing email system are realized.

For example, when a user is viewing a specific product "Panasonic 60" LED TV" the Search Ranking Diversity Based on Aspect Affinity methodology may show television mounts. In another embodiment, Search Ranking Diversity Based on Aspect Affinity methodology may use the term "mounting rack" as a query and show mounting racks of different brands.

Figure 4:
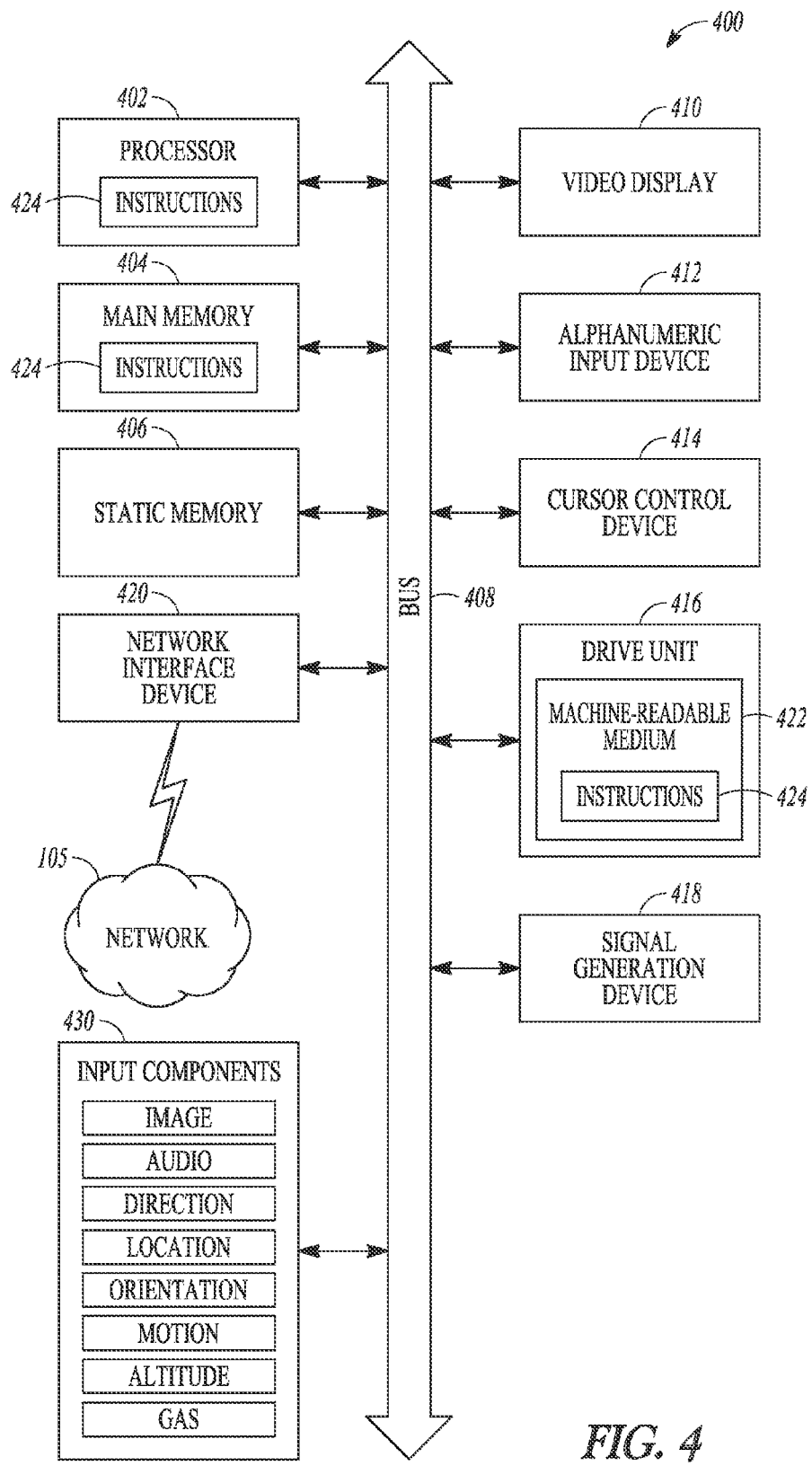
FIG. 4 is a block diagram illustrating components of a machine, according to some example embodiments, able to read instructions from a machine-readable medium and perform any one or more of the methodologies for Search Ranking Diversity Based On Aspect Affinity discussed herein.

FIG. 4 is a block diagram illustrating components of a machine 400, according to some example embodiments, able to read instructions 424 from a machine-readable medium 422 (e.g., a machine-readable storage medium, a computer-readable storage medium, or any suitable combination thereof) and perform any one or more of the methodologies discussed herein, in whole or in part. Specifically, FIG. 4 shows the machine 400 in the example form of computer system within which the instructions 424 (e.g., software, a program, an application, an applet, an app, or other executable code) for causing the machine 400 to perform any one or more of the methodologies discussed herein may be executed, in whole or in part. In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a STB, a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics, or video, display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage, or drive, unit 416, an audio signal generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 490 via the network interface device 420. For example, the network interface device 420 may communicate the instructions 424 using any one or more transfer protocols (e.g., hypertext transfer protocol (HTTP)).

In some example embodiments, the machine 400 may be a fixed or portable computing device, such as a desktop computer, laptop computer, smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to send, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm), in other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

In one embodiment, a method comprises collecting user search queries, parsing the collected user search queries for aspect phrases, identifying aspect metadata for the aspect phrases, creating a ranked index list of aspects from the aspect metadata, assigning weights to the ranked index list of aspects, receiving a user query and associating the received query with the ranked index list of aspects to produce ranked search results, and re-ranking the search results using diversified aspects from the ranked index list of aspects to produce user search results.

In another embodiment, a non-transitory machine-readable storage medium comprises instructions that, when executed by one or more processors of a machine, cause the machine to perform operations comprising collecting user search queries, parsing the collected user search queries for aspect phrases, identifying aspect metadata for the aspect phrases, creating a ranked index list of aspects from the aspect metadata, assigning weights to the ranked index list of aspects, receiving a user query and associating the received query with the ranked index list of aspects to produce ranked search results, and re-ranking the search results using diversified aspects from the ranked index list of aspects to produce user search results.

In another embodiment, a system for enabling navigation of a plurality of data items corresponding to a query comprises a communication module for receiving a user query, a search index engine for collecting user search queries, and an aspect extractor module for parsing collected user search queries for aspect phrases, identifying aspect metadata for the aspect phrases, creating a ranked index list of aspects from the aspect metadata, assigning weights to the ranked index list of aspects, associating the received query with the ranked index list of aspects to produce ranked search results and re-ranking the search results using diversified aspects from the ranked index list of aspects to produce user search results.

In another embodiment, the ranked index list of aspects is created on a per cluster basis.

In another embodiment, the ranked index list of aspects is created on a per user basis.

In another embodiment, the ranked index list of aspects is created on a per user per category basis In another embodiment, the ranked index list of aspects is created on a per user per query basis In another embodiment, re-ranking the search results comprises using a diversified list of values for the most highly correlated k identified important aspects, k being an integer.

In another embodiment, a user does not explicitly enter a query related to the user search results into a recommender or marketing system.

Thus, a method and system for Search Ranking Diversity Based on Aspect Affinity have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    collecting user search queries;
    parsing, using one or more hardware processors, the collected user search queries to identify one or more aspect phrases for a product, the aspect phrases qualifying the product;
    identifying aspect metadata for the aspect phrases, the aspect metadata indicating a query phrase type for one or more of the aspect phrases;
    creating, from the aspect metadata, a list of query phrase types associated with a user query;
    assigning weights to the list of query phrase types according to usage of the aspect phrases associated with the query phrase types;
    receiving the user query and associating the user query with the list of query phrase types to produce search results; and
    ranking the search results using the weights for the list of query phrase types associated with the user query to produce user search results.

2. The method of claim 1, wherein the ranked index list of aspects is created on a per cluster basis.

3. The method of claim 1, wherein the ranked index list of aspects is created on a per user basis.

4. The method of claim 1, wherein the ranked index list of aspects is created on a per user per category basis.

5. The method of claim 1, wherein the ranked index list of aspects is created on a per user per query basis.

6. The method of claim 1, wherein re-ranking the search results comprises using a diversified list of values for the most highly correlated k identified important aspects, k being an integer.

7. The method of claim 1, wherein a user does not explicitly enter a query related to the user search results into a recommender or marketing system.

8. A machine-readable hardware storage medium comprising instructions that, when executed by one or more processors of a machine, cause the machine to perform operations comprising:
    collecting a plurality of user search queries for a product;
    parsing the collected user search queries to determine one or more aspect phrases for the product, the aspect phrases qualifying the product;
    identifying aspect metadata for the aspect phrases, the aspect metadata indicating one or more query phrase types of the aspect phrases;
    creating, from the aspect metadata, a list of aspects for a user query;
    assigning weights to the list of aspects according to usage of the aspects in the user search queries;
    receiving the user query and producing ranked search results using the list of aspects; and
    re-ranking the ranked search results using diversified aspects based on the query phrase type(s) from the ranked index list of aspects to produce user search results.

9. The machine-readable hardware storage medium of claim 8, wherein the ranked index list of aspects is created on a per cluster basis.

10. The machine-readable hardware storage medium of claim 8, wherein the ranked index list of aspects is created on a per user basis.

11. The machine-readable hardware storage medium of claim 8, wherein the ranked index list of aspects is created on a per user per category basis.

12. The machine-readable hardware storage medium of claim 8, wherein the ranked index list of aspects is created on a per user per query basis.

13. The machine-readable hardware storage medium of claim 8, wherein re-ranking the search results comprises using a diversified list of values for the most highly correlated k identified important aspects, k being an integer.

14. The machine-readable hardware storage medium of claim 8, wherein a user does not explicitly enter a query related to the user search results into a recommender or marketing system.

15. A system for enabling navigation of a plurality of data items corresponding to a query comprising:
- a communication module for receiving a user query for a product;
- a search index engine for collecting user search queries for the product; and
- an aspect extractor hardware module for parsing collected user search queries to identify one or more aspect phrases for the product, identifying aspect metadata for the aspect phrases, the aspect metadata indicating a query phrase type for one or more of the aspect phrases, creating, from the aspect metadata, a ranked index list of aspects for the user query, the ranked index list of aspects including the user query and one or more query phrase type(s), assigning weights to the ranked index list of aspects according to usage of the aspect phrases associated with the query phrase types, associating the received user query with the ranked index list of aspects to produce ranked search results, and re-ranking the ranked search results using diversified aspects from the ranked index list of aspects to produce user search results.

16. The system of claim 15, wherein the ranked index list of aspects is created on a per cluster basis.

17. The system of claim 15, wherein the ranked index list of aspects is created on a per user basis.

18. The system of claim 15, wherein the ranked index list of aspects is created on a per user per category basis.

19. The system of claim 15, wherein the ranked index list of aspects is created on a per user per query basis.

20. The system of claim 15, wherein a user does not explicitly enter a query related to the user search results into a recommender or marketing system.

* * * * *